(12) United States Patent
Kinkead et al.

(10) Patent No.: US 9,491,902 B1
(45) Date of Patent: Nov. 15, 2016

(54) BROADCAST SPREADING TOP DRESSER FOR SAND

(71) Applicant: Turfco Manufacturing, Inc., Blaine, MN (US)

(72) Inventors: George Kinkead, Mendota Heights, MN (US); Scott Kinkead, Minneapolis, MN (US); Kenneth Sylvester, East Bethel, MN (US); Steven Ferguson, Scandia, MN (US)

(73) Assignee: Turfco Manufacturing, Inc., Blaine, MN (US)

( * ) Notice: Subject to any disclaimer, the term of this patent is extended or adjusted under 35 U.S.C. 154(b) by 49 days.

(21) Appl. No.: 14/171,798

(22) Filed: Feb. 4, 2014

Related U.S. Application Data

(60) Provisional application No. 61/761,481, filed on Feb. 6, 2013.

(51) Int. Cl.
| | |
|---|---|
| *A01C 3/06* | (2006.01) |
| *A01C 7/08* | (2006.01) |
| *A01C 15/12* | (2006.01) |
| *A01C 19/02* | (2006.01) |
| *A01C 21/00* | (2006.01) |

(52) U.S. Cl.
CPC .............. *A01C 15/12* (2013.01); *A01C 19/02* (2013.01); *A01C 21/00* (2013.01)

(58) Field of Classification Search
CPC ....... A01C 15/12; A01C 19/02; A01C 21/00
USPC .......... 239/7, 650, 657, 668, 670, 679, 681, 239/684, 687; 111/11, 130
See application file for complete search history.

(56) References Cited

U.S. PATENT DOCUMENTS

| | | | |
|---|---|---|---|
| 927,141 A | 7/1909 | Hackney | 239/679 |
| 2,500,682 A | 3/1950 | Hoffstetter | 239/679 |
| 3,097,851 A | 7/1963 | Cohrs et al. | |
| 3,113,784 A | 12/1963 | Swenson et al. | |
| RE25,709 E | 1/1965 | Swenson et al. | |
| 3,290,046 A | 12/1966 | Bell et al. | 239/682 X |
| 3,332,691 A | 7/1967 | Swenson et al. | |

(Continued)

OTHER PUBLICATIONS

Toro, Operator's Manual, manual, 2012, 44 pages, The Toro Company, Bloomington, MN, USA.

(Continued)

*Primary Examiner* — Justin Jonaitis
(74) *Attorney, Agent, or Firm* — Alan D. Kamrath; Kamrath IP Lawfirm, P.A.

(57) ABSTRACT

A top dresser advances sand contained in a hopper on a dispensing conveyor moving at a linear speed onto a rotatable spinner rotating at a rotating speed. The linear and rotatable speeds are controlled by a controller by electrically actuating first and second electrically actuated valves providing fluid flow to hydraulic motors driving the rotatable spinner and the dispensing conveyor. The rotatable and linear speeds are inputted into an electrical display electronically connected to the controller. The hydraulic flow to the second electrically actuated valve may be solely from the first electrically actuated valve to create back pressure acting as a cushion. Multiple function switches on the electrical display may be actuated in sequence to replicate a linear line relationship between the rotational and linear speeds. Start-up, run, look up and application calculation screens may be displayed on a monitor of the electrical display.

20 Claims, 13 Drawing Sheets

(56) References Cited

U.S. PATENT DOCUMENTS

| | | | |
|---|---|---|---|
| 3,344,993 A | 10/1967 | Wilder et al. | |
| 3,441,039 A | 4/1969 | Rawson | |
| 3,550,866 A | 12/1970 | Swenson | |
| 3,559,894 A | 2/1971 | Murray et al. | |
| 3,679,098 A | 7/1972 | Weiss | |
| 3,682,395 A | 8/1972 | van der Lely et al. | |
| 3,693,890 A | 9/1972 | Torrey | 239/668 |
| 3,703,260 A | 11/1972 | Grabske | |
| 3,790,090 A | 2/1974 | Lorenc et al. | |
| 3,904,129 A | 9/1975 | Lorenc | |
| 4,023,689 A | 5/1977 | Taylor et al. | |
| 4,032,074 A | 6/1977 | Amerine | |
| 4,098,433 A | 7/1978 | Oligschlaeger | |
| 4,108,010 A | 8/1978 | Taylor et al. | |
| 4,124,167 A | 11/1978 | Coleman | 239/673 |
| 4,212,428 A | 7/1980 | Walker | |
| 4,367,848 A | 1/1983 | Ehmke et al. | 239/676 X |
| 4,373,668 A * | 2/1983 | Forbes et al. | 239/74 |
| 4,438,873 A | 3/1984 | Kaercher, Jr. | |
| 4,473,184 A | 9/1984 | Martin | |
| 4,583,693 A | 4/1986 | Harder | |
| 4,591,102 A | 5/1986 | Clarke | 239/682 X |
| 4,685,619 A | 8/1987 | Harder | |
| 4,700,895 A | 10/1987 | Takata | |
| 4,804,145 A | 2/1989 | Seymour et al. | |
| 4,842,202 A | 6/1989 | van der Lely et al. | |
| 5,046,664 A | 9/1991 | van der Lely et al. | |
| 5,096,125 A | 3/1992 | Wise et al. | |
| 5,170,947 A | 12/1992 | Houle et al. | |
| 5,170,948 A | 12/1992 | Glick et al. | |
| 5,186,396 A | 2/1993 | Wise et al. | |
| 5,307,952 A | 5/1994 | Worrel et al. | 239/672 X |
| 5,307,965 A | 5/1994 | Worrel | 222/616 |
| 5,370,321 A | 12/1994 | Bianco | |
| 5,478,104 A | 12/1995 | Worrel et al. | 280/699 |
| 5,501,403 A | 3/1996 | van Vooren | |
| 5,501,405 A | 3/1996 | Doornek | |
| 5,533,676 A | 7/1996 | Conley | |
| 5,645,228 A | 7/1997 | Zwart | |
| 5,802,994 A * | 9/1998 | Kinkead et al. | 111/11 |
| 5,842,649 A * | 12/1998 | Beck et al. | 239/677 |
| 5,947,391 A | 9/1999 | Beck et al. | |
| 5,950,933 A | 9/1999 | Balmer | 239/655 |
| 5,976,011 A | 11/1999 | Hartman | |
| 5,992,134 A | 11/1999 | Blide et al. | |
| 6,024,033 A * | 2/2000 | Kinkead et al. | 111/11 |
| 6,058,860 A | 5/2000 | Kinkead et al. | |
| 6,149,079 A | 11/2000 | Kinkead et al. | |
| 6,202,944 B1 | 3/2001 | McCrory | 239/658 |
| 6,220,532 B1 | 4/2001 | Manon et al. | |
| 6,508,419 B1 * | 1/2003 | Kinkead et al. | 239/668 |
| 2001/0002036 A1 * | 5/2001 | Nystrom | 239/675 |
| 2001/0019087 A1 * | 9/2001 | Andersonn et al. | 239/650 |
| 2002/0179750 A1 * | 12/2002 | Truan et al. | 239/679 |
| 2005/0242124 A1 * | 11/2005 | Isaman et al. | 222/251 |
| 2011/0017847 A1 * | 1/2011 | Truan et al. | 239/661 |

OTHER PUBLICATIONS

Owner's Manual, TERRATOPPER T-750, TerraCare Products Co., Inc., P.O. Box 250, Pardeeville, WI (undated but prior art to application).

Photograph of T-1000, TerraCare Products Co., Inc., P.O. Box 250, Pardeeville, WI.

MULTISPREAD™, printed from www.earthandturf.com (date unknown).

Dakota Peat & Equipment, Dakota Turf Tenders: Spreader Application Rates, web page and program pages, Dec. 3, 2015, 5 pages, Dakota Equipment, Grand Forks, ND.

* cited by examiner

FIG. 9C

| P# | App Rate Ft³/1000 ft² | | | |
|---|---|---|---|---|
| "A" | 0.53 | 95 | 50 | B |
| "B" | 1.1 | 55 | 75 | B |
| "C" | 2.06 | 25 | 100 | B |
| "D" | 4.1 | 100 | 100 | H |

Pre-Sets estimated at 3.0 MPH

VH estimated at 2.5 MPH

| "VH" | 10.6 | 25 | 100 | max |

Estimation at 3.0 mph ▷ calcs

BROADCAST SPREADING TOP DRESSER FOR SAND

CROSS REFERENCE

This application claims benefit of provisional Application Ser. No. 61/761,481 filed Feb. 6, 2013, which is hereby incorporated herein by reference.

BACKGROUND

Generally, an apparatus for dispensing or spreading material, particularly an apparatus for top dressing terrain, more particularly, a broadcast spreading top dresser, and specifically a broadcast spreading top dresser for sand is shown and described.

Various apparatus exist for applying top dressing to the turf of golf courses, lawns, football, baseball and soccer fields, parks, recreational areas, and the like, for applying calcined clay on baseball diamonds, for sanding icy sidewalks and driveways, and for like applications of a ribbon of material at a pre-selected rate. Examples of such apparatus are shown in U.S. Pat. No. 4,438,873 which has been widely and very successfully marketed under the trademark TURFCO METE-R-MATIC and in U.S. Pat. No. 5,307,952 which has been widely and very successfully marketed under various trademarks. With the increasing awareness of the importance of top dressing in turf management, an increasing need exists for improved dispensers to allow the effective, efficient application of material with minimal damage to the turf and with increased ease of operation. Furthermore, with the increasing awareness of the importance of top dressing in management of golf course greens, an increasing need exists for improved dispensers to allow calculatable and repeatable dispensing of sand evenly and at a pre-selected rate.

Specifically during top dressing of selected turfs especially but not limited to golf greens, it is necessary to spread the top dressing material in an equal amount and specifically without clumps or bunches where top dressing material is dispensed at a higher rate than at other locations. Top dressers of the drop type disclosed in U.S. Pat. Nos. 4,438, 873 and 5,307,952 have been highly effective at applying top dressing evenly to turf. However, such drop top dressers only dispensed top dressing material across a width generally equal to the width of the top dresser itself. As top dressing often occurred during daylight, it was necessary to take the green out of play during the top dressing operation and thus the width of the dispensed top dressing material plays a major role in the number of passes required to top dress the green as well as the time required for the top dressing operation and the time that the green was out of play. Further, such drop top dressers were not very effective in spreading extremely minimal amounts of top dressing material.

Broadcast spreading top dressers have been introduced allowing spreading of minimal amounts of top dressing material over a greater width of turf. An example of such a top dresser is shown in U.S. Pat. No. 6,508,419, which has been widely and very successfully marketed, and which is hereby incorporated herein by reference. However, since various factors influence the rate of dispensing, including, but not limited to, the amount of material in the hopper at any given time during dispensing, dispensing at the pre-selected rate was difficult, if not impossible, to be assured. Prior attempts to obtain selected rate dispensing involved trial and error including making test measurements by placing catch patches on selected areas of the golf course green, and refusing to make adjustments once a desired rate of application was discovered. Thus, if greater rates of application were desired, multiple passes over the same area were made to reach the desired rate of application.

Thus, a need continues to exist for the application of extremely minimal amounts of material to turf and in a manner to not only reduce the number of passes required to top dress a width of such turf and to reduce the amount of time needed to perform such top dressing but in a controllable, calculated, adjustable and repeatable manner.

SUMMARY

This need and other problems in the field of top dressing are solved by providing a top dresser for broadcast spreading by advancing sand contained in a hopper on a dispensing conveyor moving at a linear speed onto a rotatable spinner rotating at a rotating speed. The linear and rotatable speeds are controlled by a controller by electrically actuating first and second electrically actuated valves providing fluid flow to hydraulic motors driving the rotatable spinner and the dispensing conveyor. The rotatable and linear speeds are inputted into an electrical display electronically connected to the controller. The hydraulic flow to the second electrically actuated valve may be solely from the first electrically actuated valve to create back pressure acting as a cushion. Multiple function switches on the electrical display may be actuated in sequence to replicate a linear line relationship between the rotational and linear speeds. Start-up, run, look up and application calculation screens may be displayed on a monitor of the electrical display. A scroll key can be actuated, such as by moving upward or downward and left-ward or right-ward to change the rotational and linear speeds displayed. The application rate and application volume may be calculated by inputting the linear and rotational speeds and the gap between a metering gate and the dispensing conveyor.

Surprisingly, all of the above objectives can be satisfied in the field of material dispensing by the illustrative embodiments of a top dresser according to the detailed descriptions and in connection with the drawings.

DESCRIPTION OF THE DRAWINGS

FIGS. 9B-9E show plan views of screens of the display of FIG. 3.

Figure 1:
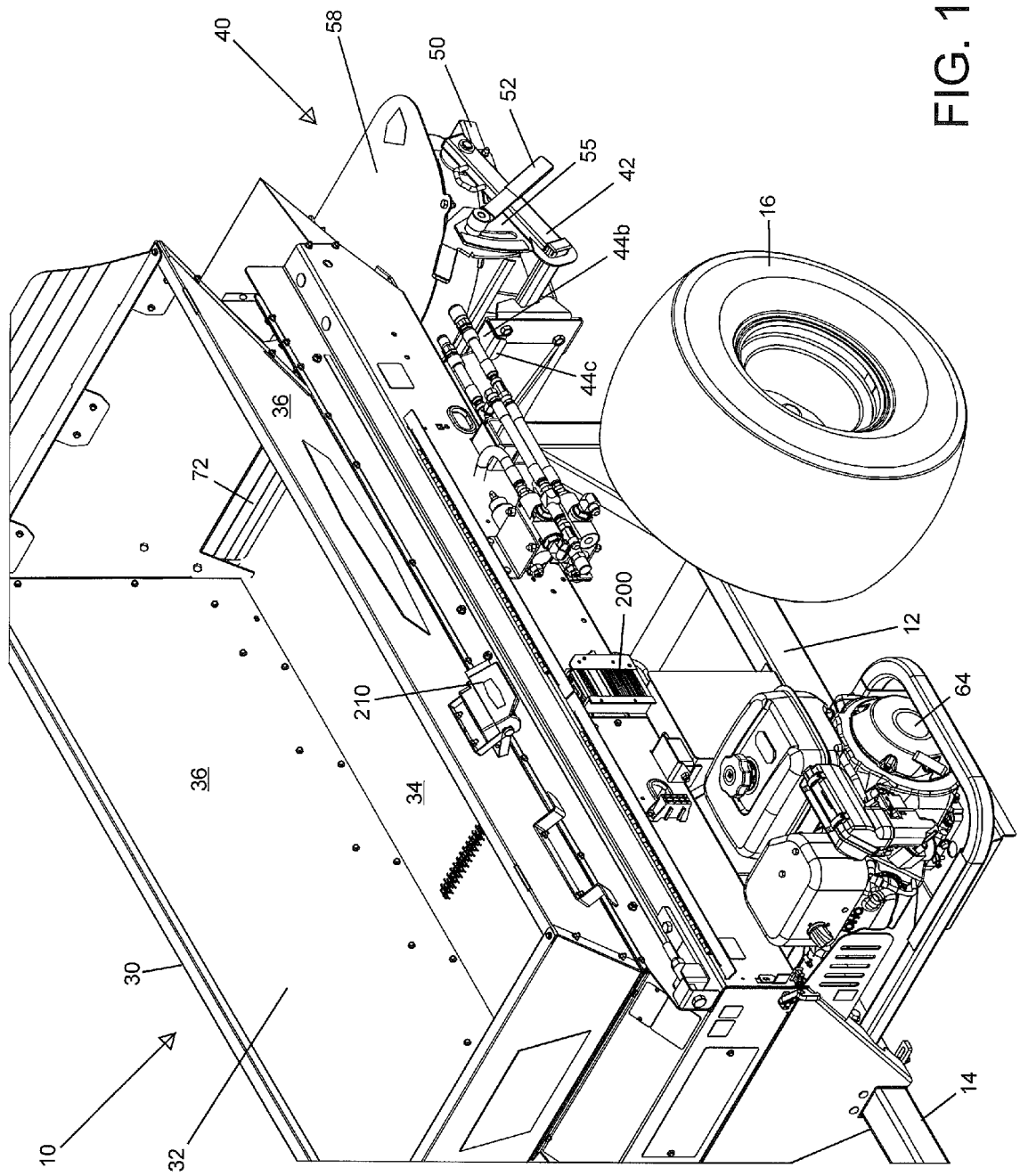
FIG. 1 shows a front perspective view of a top dresser.
Figure 2:
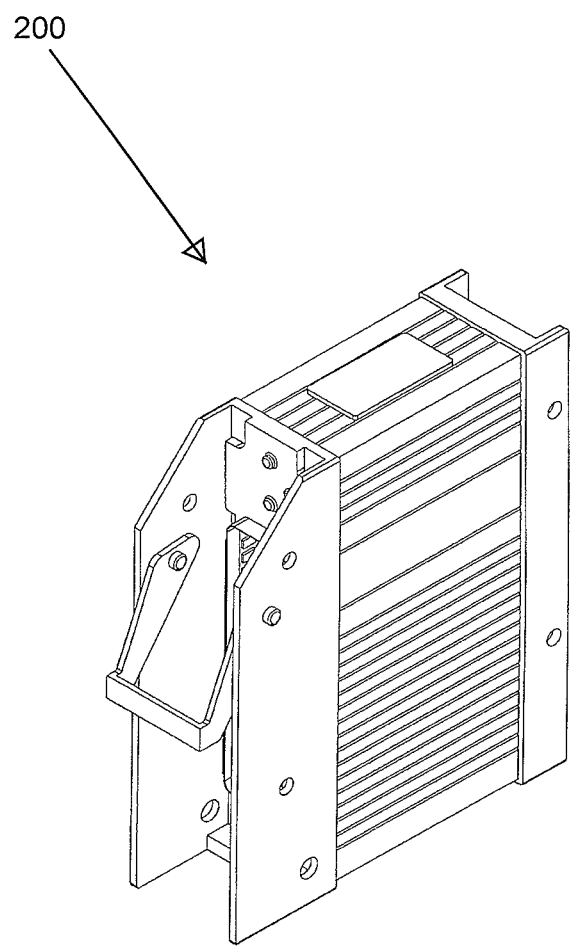
FIG. 2 shows a perspective view of a controller for the top dresser of FIG. 1.
Figure 3:
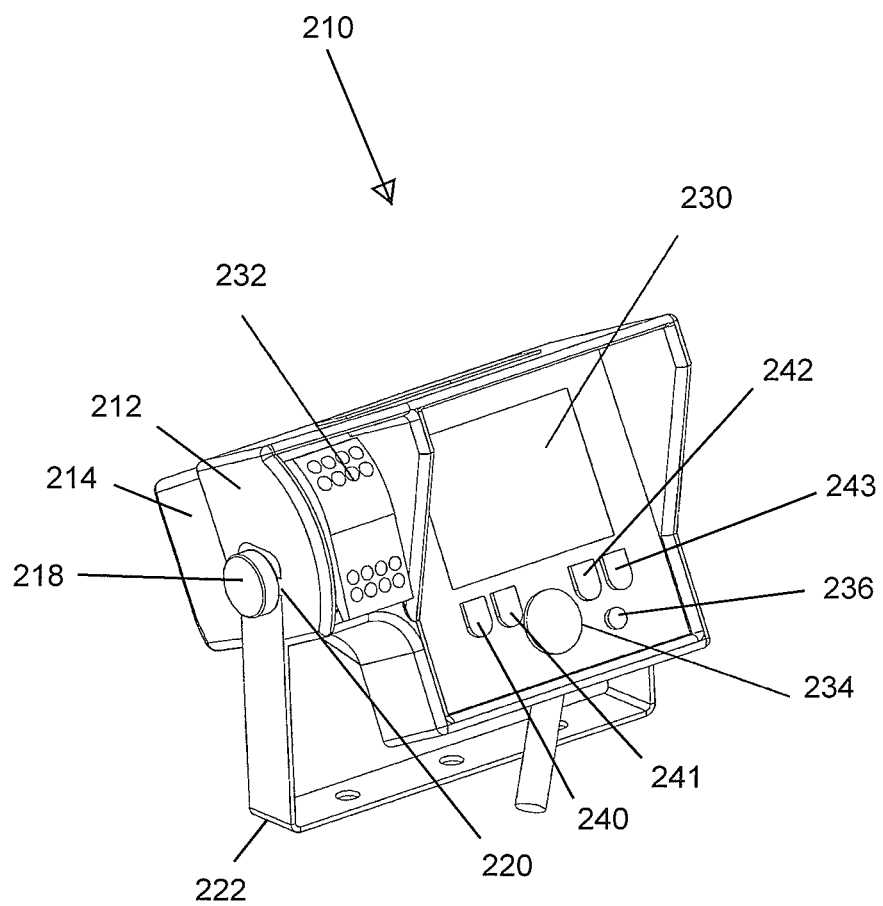
FIG. 3 shows a perspective view of a display for the top dresser of FIG. 1.
Figure 4:
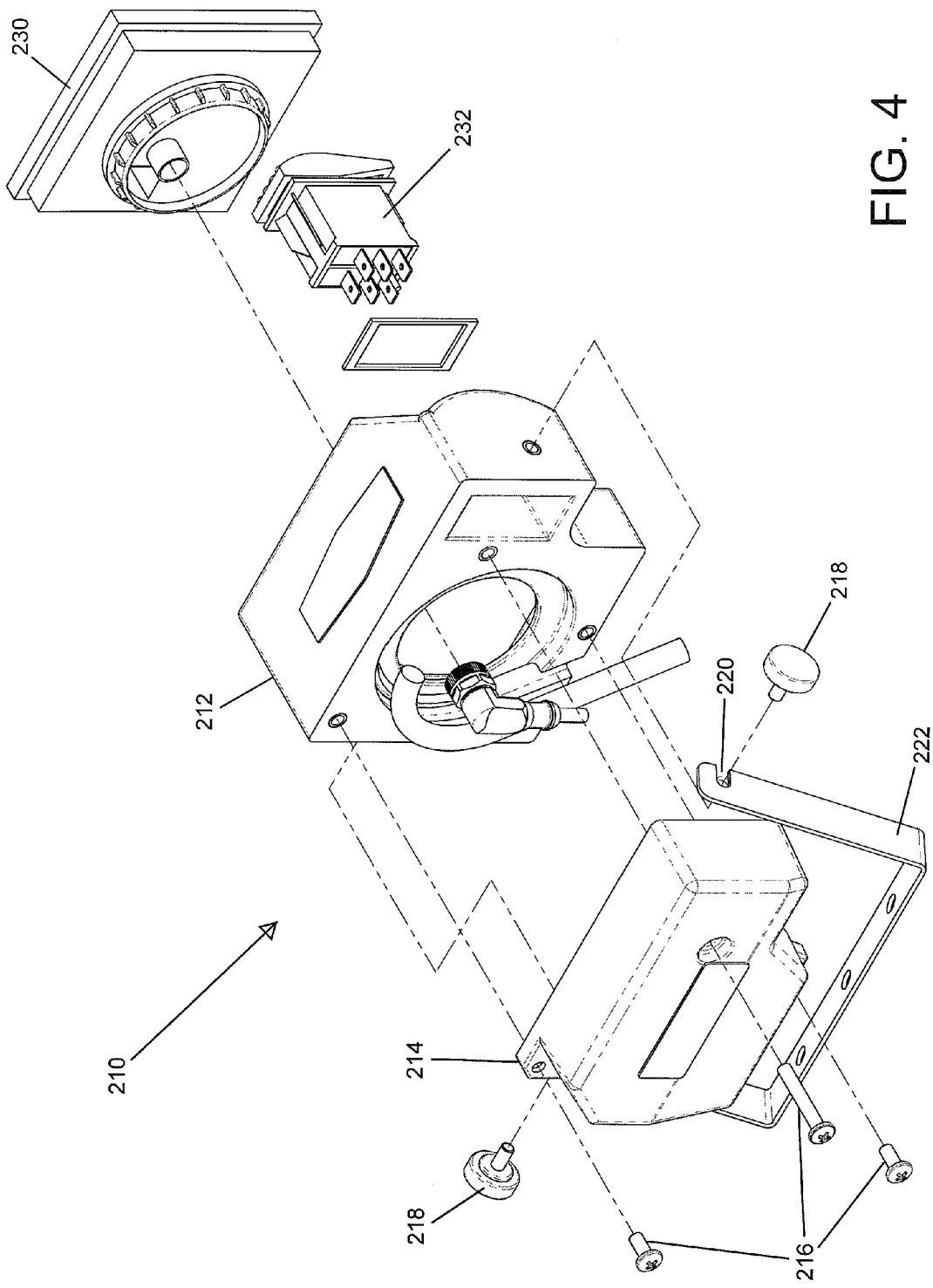
FIG. 4 shows an exploded perspective view of the display of FIG. 3.
Figure 5:
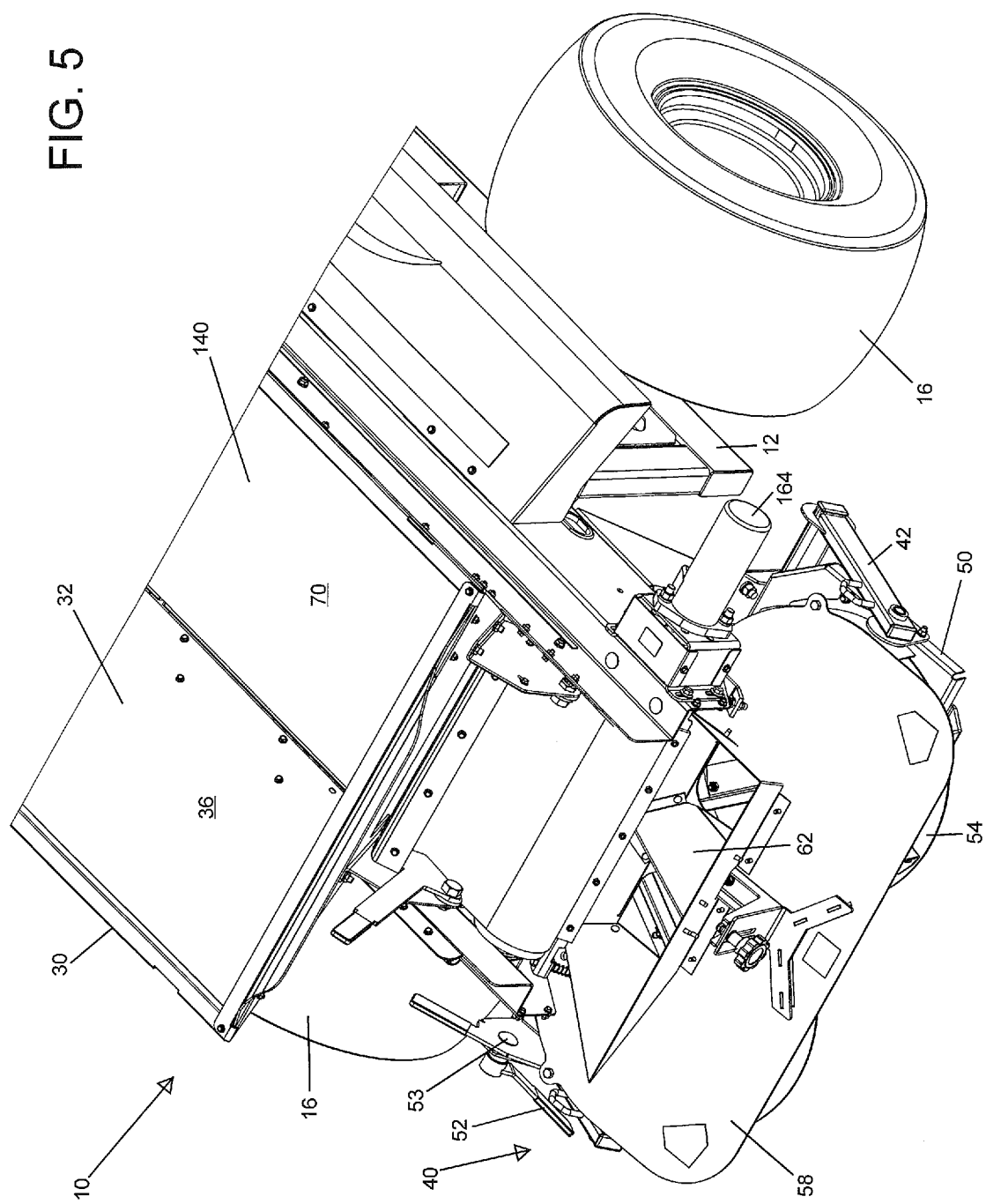
FIG. 5 shows a rear perspective view of the top dresser of FIG. 1.
Figure 6:
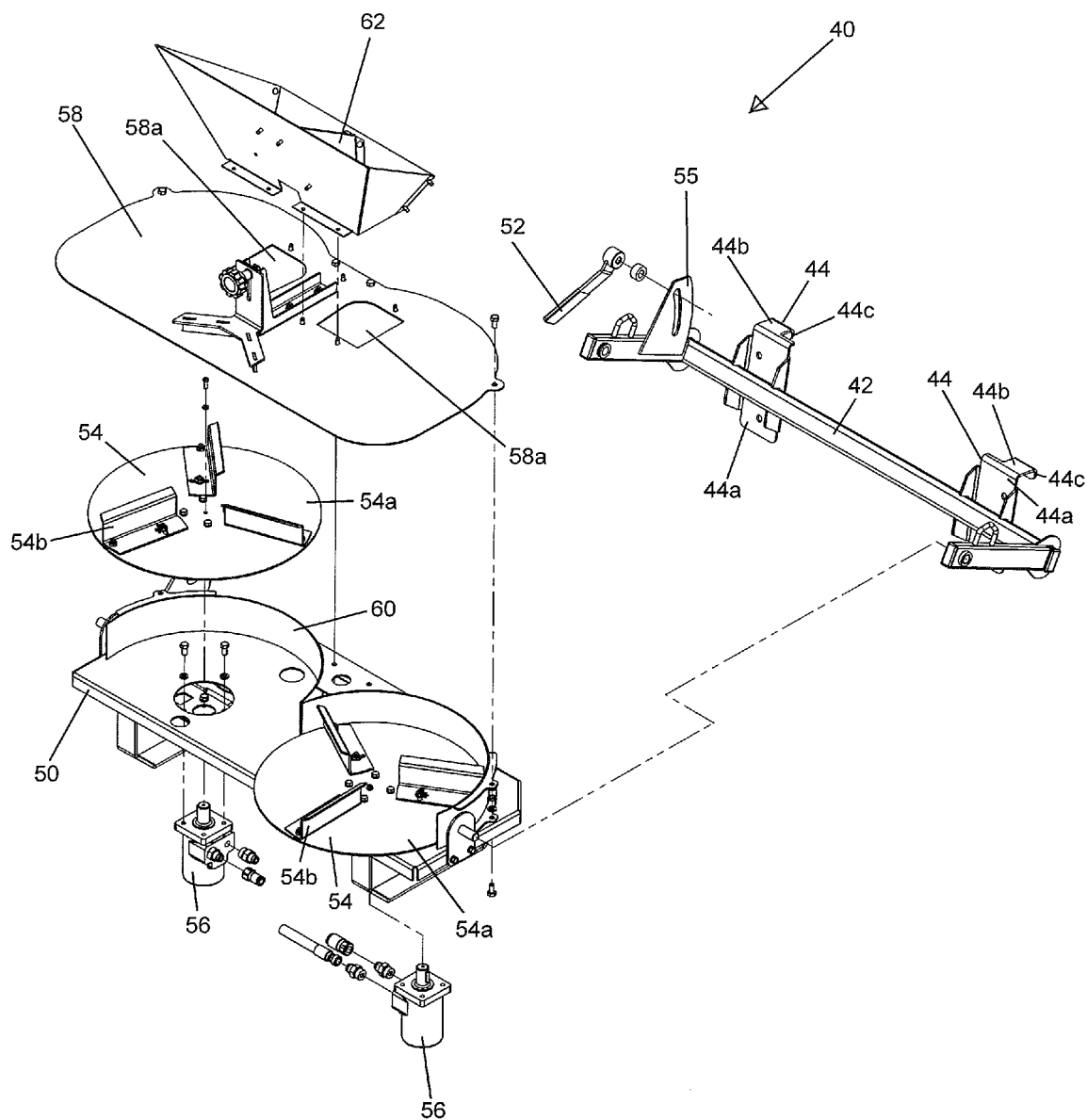
FIG. 6 shows an exploded perspective view of a spinner assembly for the top dresser of FIG. 1.
Figure 7:
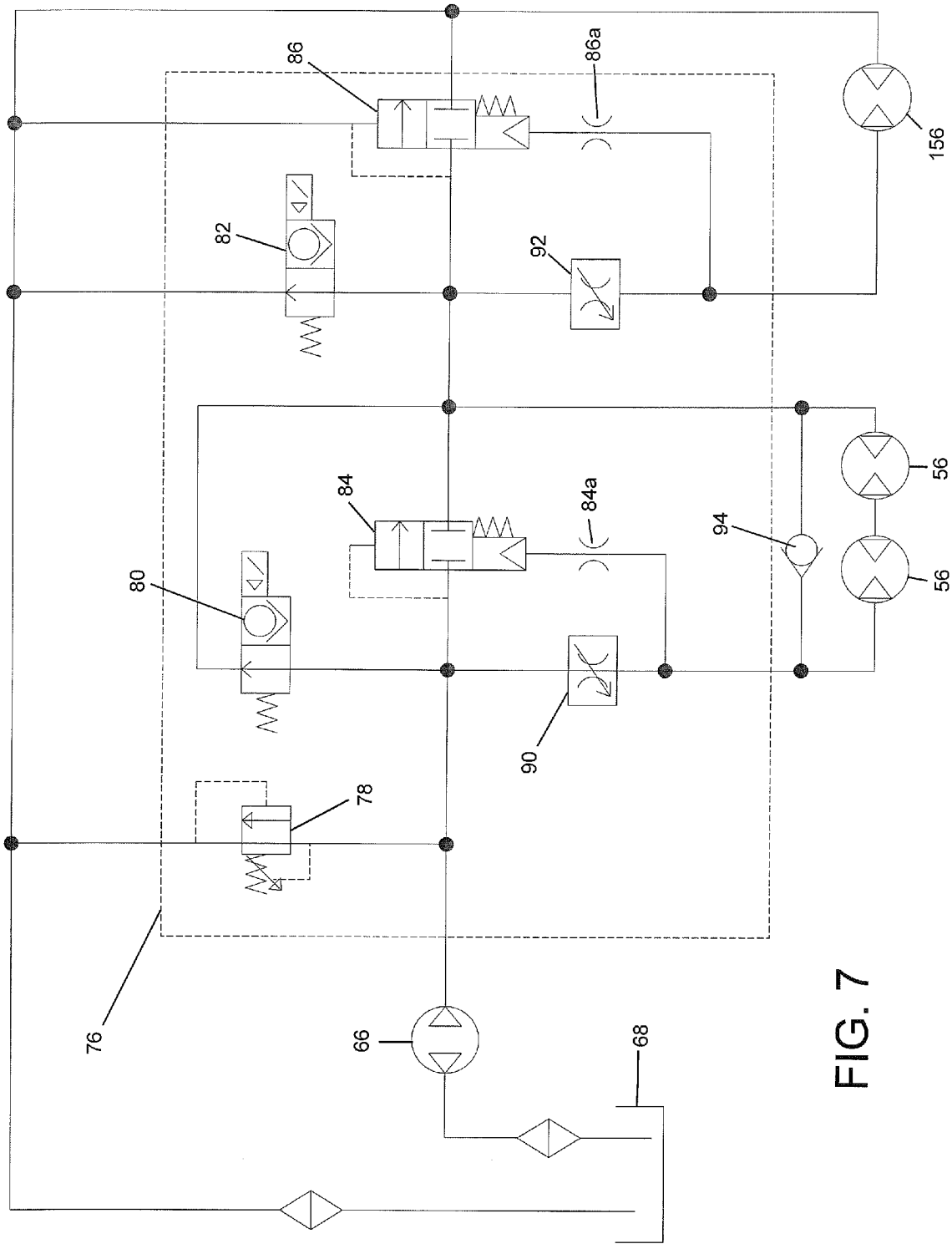
FIG. 7 shows a schematic view of a hydraulic system of the top dresser of FIG. 1.
Figure 8:
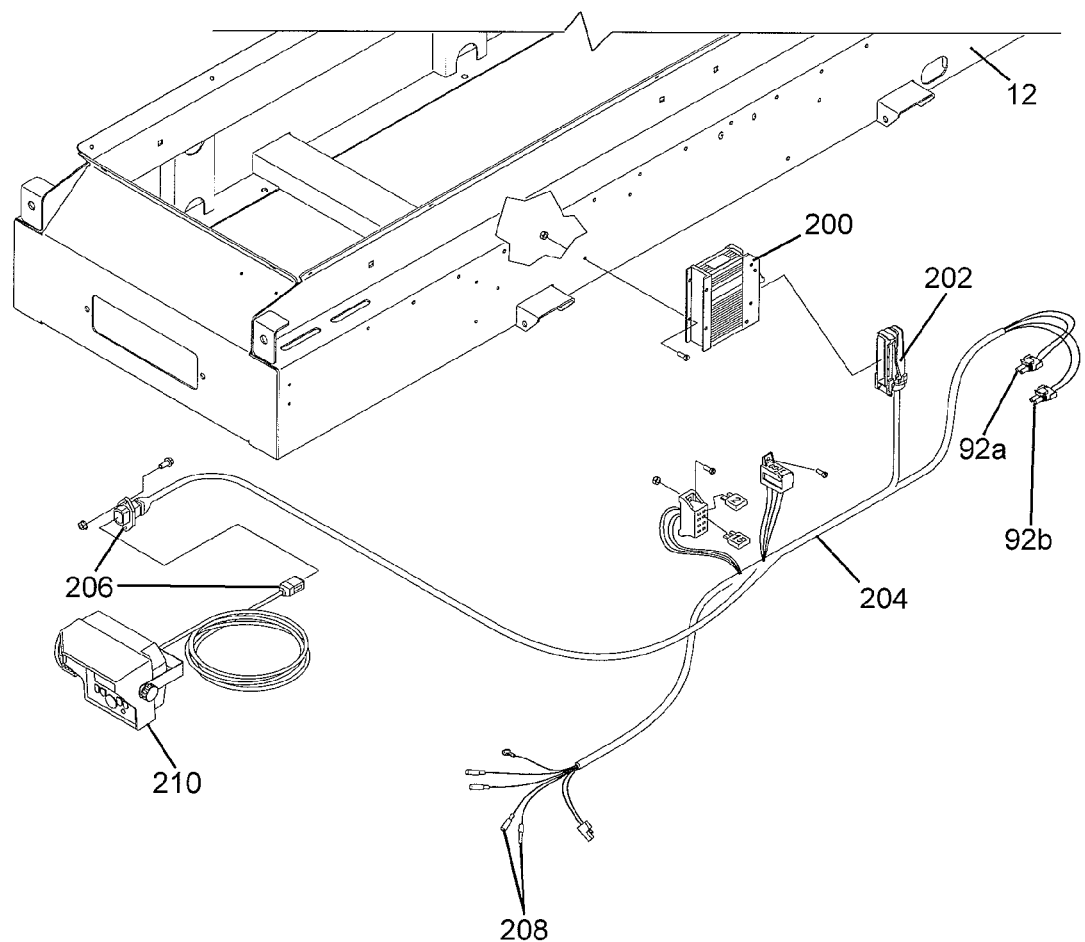
FIG. 8 shows a schematic view of an electrical control system of the top dresser of FIG. 1.

All figures are drawn for ease of explanation of the basic teachings only; the extensions of the Figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "top", "bottom", "first", "second", "inside", "outside", "end", "side", "above", "longitudinal", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

A top dresser is shown in the drawings and generally designated 10. In the form shown, top dresser 10 includes a frame 12 having a drawbar 14 by which top dresser 10 can be coupled to a towing tractor or utility vehicle for pulling thereby in a direction. In the form shown, frame 12 is movably supported upon the ground by a pair of high floatation wheels 16.

A hopper 30 for containing top dressing material is mounted on frame 12. Hopper 30 generally includes an open top 32, a closed floor or bottom 34, first and second, sloping, closed sides 36, a back and a front. In the form shown, sides 36 extend at an obtuse angle outwardly relative to bottom 34.

In the form shown to advance material contained in hopper 30, sheeting 70 is utilized in a horizontally extending, endless belt conveyor 140 located at the bottom of hopper 30 such as generally of the type shown in U.S. Pat. No. 4,438,873, which is hereby incorporated herein by reference. Specifically, conveyor 140 is disposed so that sheeting 70 in the form of an endless belt passes beneath hopper 30, to have gravitationally discharged thereon whatever material is contained in hopper 30 that is to be used in dressing the turf and specifically sand when utilized to top dress golf course greens. Sheeting 70 in the form of an endless belt passes over a first, generally cylindrical roller rotatably mounted on a transverse, horizontal shaft which may be adjustable in a fore and aft direction. Conveyor 140 further includes a second, generally cylindrical roller mounted for rotation on a transverse, horizontal shaft, with the second roller being parallel to and horizontally spaced from the first roller. The second roller is rotated by a hydraulic motor 164. Sheeting 70 passes over a platen or bed plate that is fixedly supported by bottom 34 of hopper 30 of top dresser 10, with the bed plate optionally including a coating or the like to reduce friction between the bed plate and sheeting 70.

Top dresser 10 further includes a metering gate 72 movably mounted at the back of hopper 30 and movable relative to conveyor 140. Conveyor 140 dispenses material from hopper 30 through a gap between metering gate 72 and conveyor 140 at the back of hopper 30 to meter the amount of material being dispensed by sheeting 70. Specifically, gate 72 is movable away from conveyor 140 by any suitable manner to create a larger gap for material to pass therethrough such as by pivotally moving gate 72 manually or by hydraulic actuators.

In the form shown, sheeting 70 is formed from an endless belt having an outer surface which is relatively smooth between sides 36 of hopper 30 and in the form shown with the outer surface including a shallow pattern. Particularly, sheeting 70 includes relatively small depressions of a size generally corresponding to the particle size of the top dressing material which is typically dispensed by top dresser 10. Specifically, in the form shown, the depressions are of a size no longer than 0.20 inch (0.5 cm) in any direction and in the most preferred form are generally rectangular shaped of a length of 0.20 inch (0.5 cm) and a width of 0.15 inch (0.38 cm) and a depth of 0.05 inch (0.13 cm). Sheeting 70 in the form shown is formed of rubber but can be formed of other materials which are not subject to corrosion or other degradation by exposure to top dressing material such as plastic as long as the functional requirements for conveyor 140 are met.

Top dresser 10 includes a spinner assembly 40 for dispensing the material contained in hopper 30 to a width generally greater than the width of hopper 30 and top dresser 10. In the form shown, a generally U-shaped support 42 is removably secured to frame 12. Particularly, in the form shown, first and second clips 44 are secured to the central portion of support 42 in a spaced relation such as by welding. Clips 44 each generally include a front plate 44a for abutting with the rear face of a cross beam of frame 12, a top plate 44b extending generally perpendicularly from front plate 44a for a distance generally equal to the thickness of the cross beam, and a latching plate 44c extending generally perpendicularly downward from top plate 44b and parallel to front plate 44a. In the form shown, clips 44 are positioned with top plate 44b extending over the horizontal top face of the cross beam and with latching plate 44c and front plate 44a extending over the vertical front and back faces of the cross beam, respectively. Clips 44 can be secured in position such as by bolts or similar pins removably extending through the cross beam and clips 44. Rubber grommets can be mounted in the cross beam for abutting with support 42 when secured to the cross beam by clips 44.

Assembly 40 further includes a carrier 50 pivotally mounted to support 42 about a transversely extending carrier axis, such as between the free ends of the legs of support 42. Suitable provisions such as a lockable lever 52 can be provided to selectively position carrier 50 at a desired pivotal angle relative to support 42. In the form shown, lever 52 is threadably received on a stud 53 extending from carrier 50 and through a slot formed in an indication tab 55. In the form shown, assembly 40 pivots 14 degrees above and 12 degrees below a horizontal level.

Assembly 40 further includes a pair of spinners 54 rotatably mounted to carrier 50 about spaced, parallel axes extending generally perpendicular to the carrier axis. Each spinner 54 includes a spinner plate 54a mounting three veins 54b equally circumferentially spaced 120 degrees from each other. Each vein 54b includes suitable provisions such as slots as shown to allow adjustment to a different angle relative to the center axis of spinner plate 54a to help the spread pattern when sand being dispersed is wet or heavy. Veins 54b are Z-shaped to capture the sand to result in the desired spread width and dynamic drag forces to control the spread quality. Each spinner 54 has associated therewith a hydraulic motor 56 for rotating spinners 54 relative to carrier 50 at the same speed but in opposite directions. Spinners 54 are located between carrier 50 and an upper sheet 58 held in a spaced, parallel relation to carrier 50 by a spinner guide 60. In the form shown, guide 60 is in the form of interconnected semi-cylindrical portions extending around the front and sides of spinners 54. Thus, carrier 50, upper sheet 58 and spinner guide 60 partially enclose spinners 54. A dividing chute 62 is positioned on upper sheet 58 for receiving material from conveyor 140 and generally directing the material dispensed from the transverse half of sheet 70 through a drop zone 58*a* upon the respective spinner 54. As the speed of sheet 70 increases from being stopped to its highest speed of 1,170 inches per minute, sheet 70 starts throwing sand rather than dropping sand. Dividing chute 62 directs the sand into drop zones 58 independent of the speed of sheet 70. Further, as spinner assembly 40 is pivotal above or below a horizontal level, the panels forming dividing chute 62 must be at an angle greater than the angle of repose where a granular material can impede a sliding motion and withstand static motion, with the angle of repose for sand being 30 degrees.

The machine functions including movement of sheeting 70 and rotation of spinners 54 in top dresser 10 are powered by a self-contained, fourteen horsepower, overhead valve, internal combustion gas engine 64 suitably mounted to frame 12. Engine 64 drives a hydraulic pump 66 for drawing hydraulic fluid from a storage tank 68 and supplying it under pressure to a manifold block 76 internally divided into a spinner section and a belt section. A pressure relief valve 78 is included in manifold block 76 to protect the hydraulic system. Solenoid valves 80 and 82 turn the spinner and belt sections on and off respectively. Further, pressure compensated control valves 84 and 86 use piloted pressure against selected spring and flow through a sized orifice 84*a* and 86*a*. Flow to hydraulic motors 56 and 164 is controlled through flow control valves 90 and 92, respectively. A one way check valve 94 is provided parallel to hydraulic motors 56 in series to allow hydraulic oil to circulate through hydraulic motors 56 as they coast to a stop if valve 80 is turned off which could cause motors 56 to pump oil and cause an internal vacuum which will in turn cause cavitation potentially resulting in harm to the components. With valve 80 turned on, check valve 94 will be sealed due to back pressure.

With valves 80 and 90 turned on, all pressure and flow are routed through hydraulic motors 56 first, making the hydraulic system a spinner primary. Hydraulic motors 56 are sized to give a maximum speed to 840 rpm. All flow and remaining pressure is routed after hydraulic motors 56 is through hydraulic motor 156 second. Hydraulic motor 156 is sized to give a maximum speed of 1170 inches per minute with minimum expected flow rates. The back pressure of hydraulic motor 156 behind hydraulic motors 56 acts like a cushion as well as pressure to hydraulic motors 156 being relatively constant achieves overall control of the hydraulic system. Control valves 84 and 86 provide a logic element to the spinner and belt sections due to the sizing relative to the internal spring and orifices 84*a* and 86 providing a stable flow at any spinner speed requirements and pressure fluctuation. Pump 66 driven by engine 64 has a flow rate of 6.4 gpm, but when driven as part of a truck unit, can have flow rates of 7.0, 7.5 and 8.0 gpm.

Flow control valves 90 and 92 receive electrical signals provided by a controller 200 to dictate the amount of travel and, thus, the maximum and minimum flow rates to hydraulic motors 56 and 156. Specifically, controller 200 is a Pulse Width Modulation (PWM) system of a closed loop design and can be suitably connected to top dresser 10 such as to frame 12. Controller 200 controls flow control valves 90 and 92 according to input by an operator through the use of an electrical display 210 suitably connected to top dresser 10 such as to side 36 of hopper 34. Particularly, controller 200 is electrically connected by a connector 202 of an electrical harness 204, and display 210 is electrically connected by a connector 206. Electrical harness 204 further includes connectors 208 for electrical connection to a suitable battery of top dresser 10 or of its tow or carriage vehicle. Furthermore, electrical harness 204 further includes connectors 90*a* and 92*a* electrically connected to flow control valves 90 and 92.

Display 210 generally includes a front housing 212 and a rear housing 214 suitably interconnected together such as by bolts 216. In the form shown, display 210 is removably mounted to top dresser 10 by tighteners 218 threadably received in front housing 212 and slideably received in slots 220 formed in mount 222 in turn suitably secured to side 36 of hopper 34. Display 210 further includes a display screen 230, a three position switch 232, a scroll key (rocker switch) 234, a start switch 236, and function switches 240, 241, 242 and 243. The overall size of display 210 allows it to fit into the operator's hand and allows the operator to reach all of switches 232, 236, 240, 241, 242 and 243 and scroll key 234 with one finger.

Switch 232 has first, second and third positions. In the first position, flow control valves 90 and 92 are both closed (spinners 54 and conveyor 140 stopped). In the second position, flow control valve 90 is opened while flow control valve 92 is closed (spinners 54 rotate while conveyor 140) is stopped). In the third position, flow control valves 90 and 92 are both open (spinners 54 rotate and conveyor 140 moves). As the second position is intermediate the first and third positions, conveyor 140 cannot be switched to move without spinners 54 rotating.

Figure 9A:
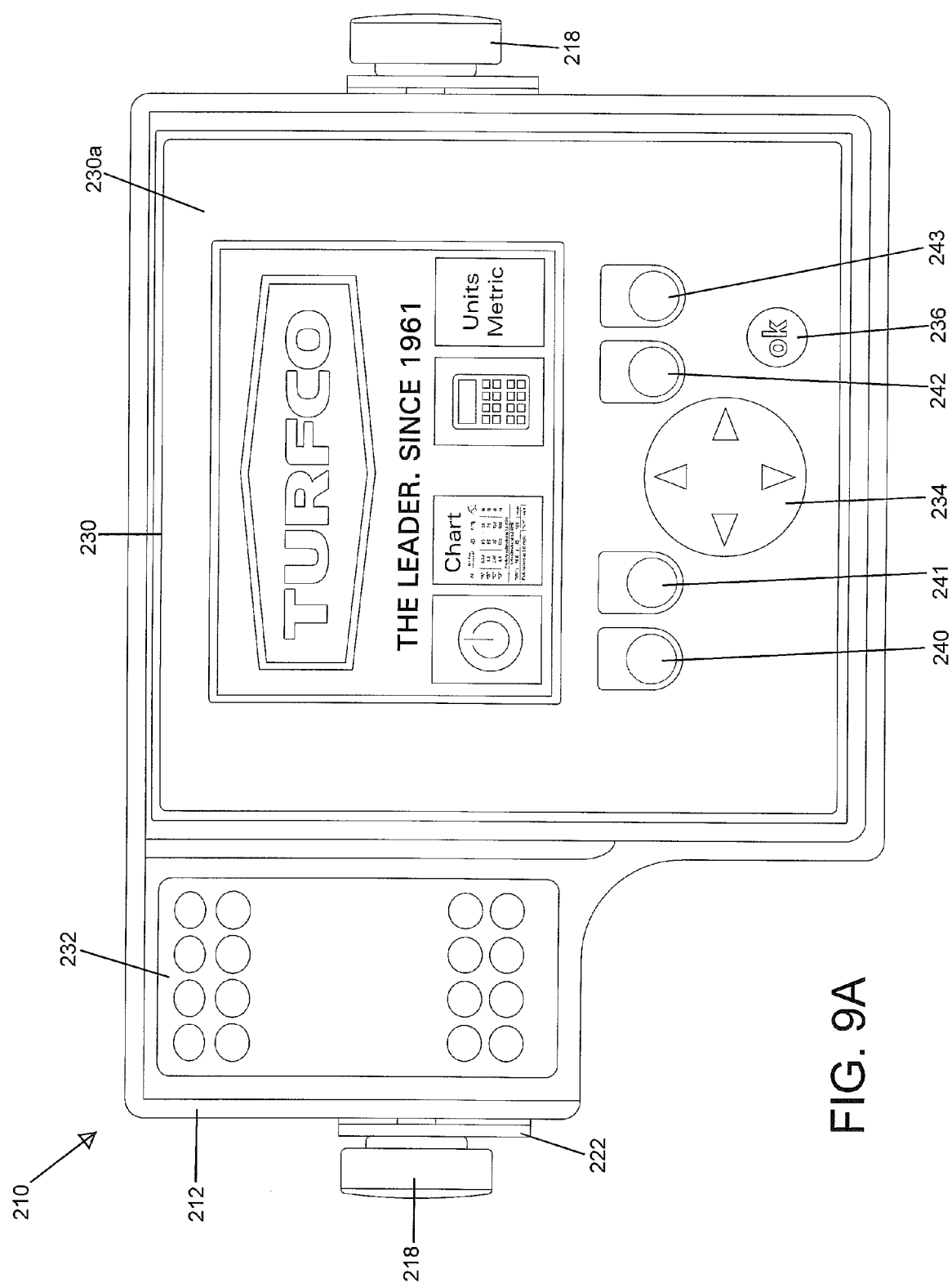
FIG. 9A shows a plan view of the display of FIG. 3 displaying a start-up screen.

FIG. 9A shows display 210 with an illustrative start-up screen 230*a* which first appears when the ignition switch for engine 64 is turned on or when start switch 236 is turned on.

Figure 9B:
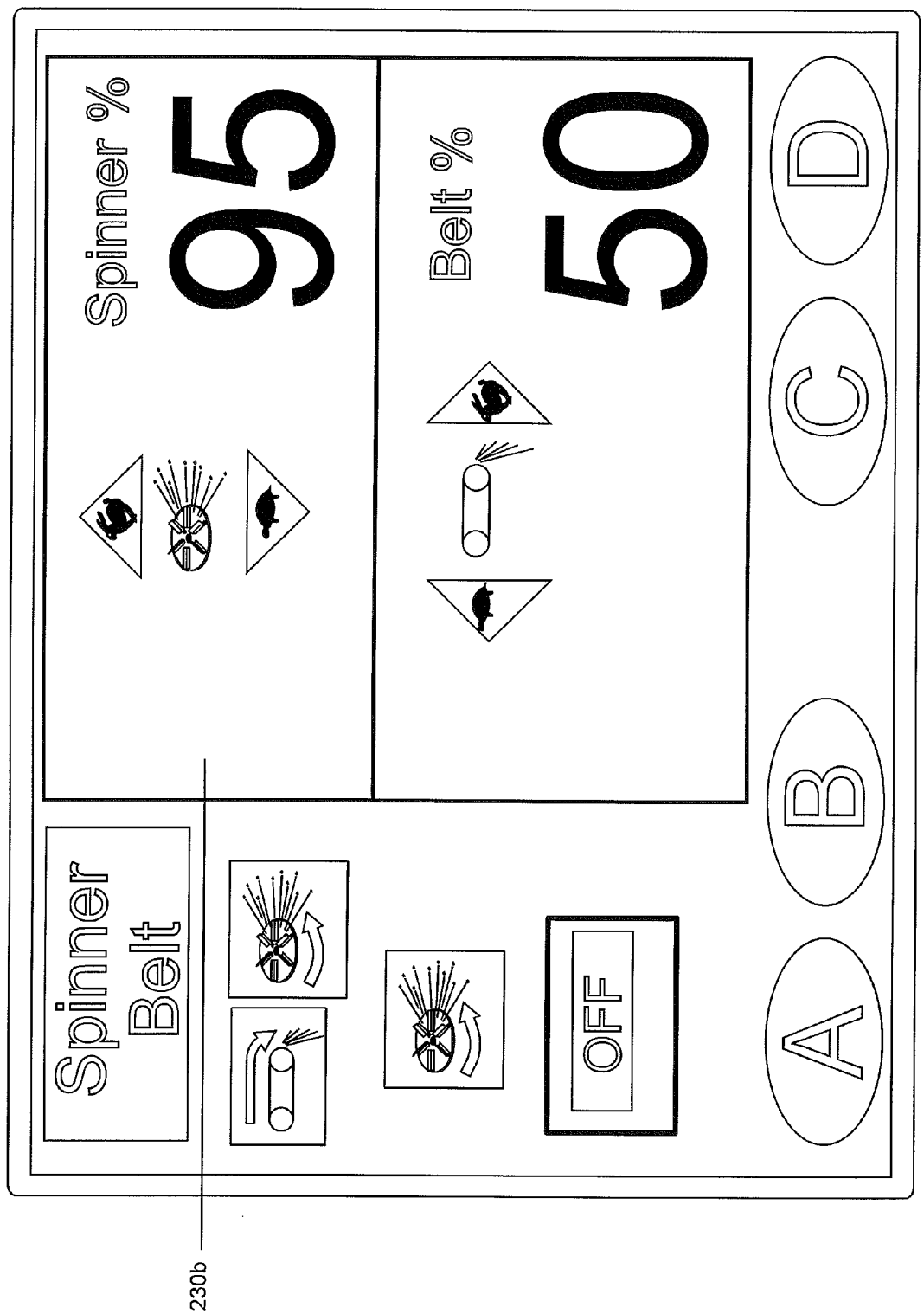

FIG. 9B shows an illustrative run screen 230*b* which appears when function switch 240 is pressed when start-up screen 230 is being displayed. In screen 230*b*, the status of switch 232 as well as the speeds of spinners 54 and conveyor 140 such as a percentage of their maximum speeds are displayed. The speed of spinners 54 can be increased or decreased by pressing scroll key 234 upward or downward in the form shown. Similarly, the speed of conveyor 140 can be increased or decreased by pressing scroll key 234 to the right or left in the form shown. Furthermore, speeds of spinners 54 and conveyor 140 can be changed to factory pre-set combinations by pressing one of function switches 240, 241, 242, or 243. As examples, pressing switch 240 results in spinner and conveyor speeds of 95 and 50%, respectively; pressing switch 241 results in spinner and conveyor speeds of 55 and 75%, respectively; pressing switch 242 results in spinner and conveyor speeds of 25 and 100%, respectively; and pressing switch 243 results in spinner and conveyor speeds of 100 and 100%, respectively.

FIG. 9C shows an illustrative look up screen 230*c* which appears when function switch 241 is pressed when start-up screen 230 is being displayed. Screen 230*c* shows the application rates of the factory-set combinations of run screen 230*b*. In the form shown, the content of screen 230*c* cannot be changed. However, by pressing function switch 242 when screen 230*c* is being displayed, application calculation screen 230*d* appears.

Figure 9D:
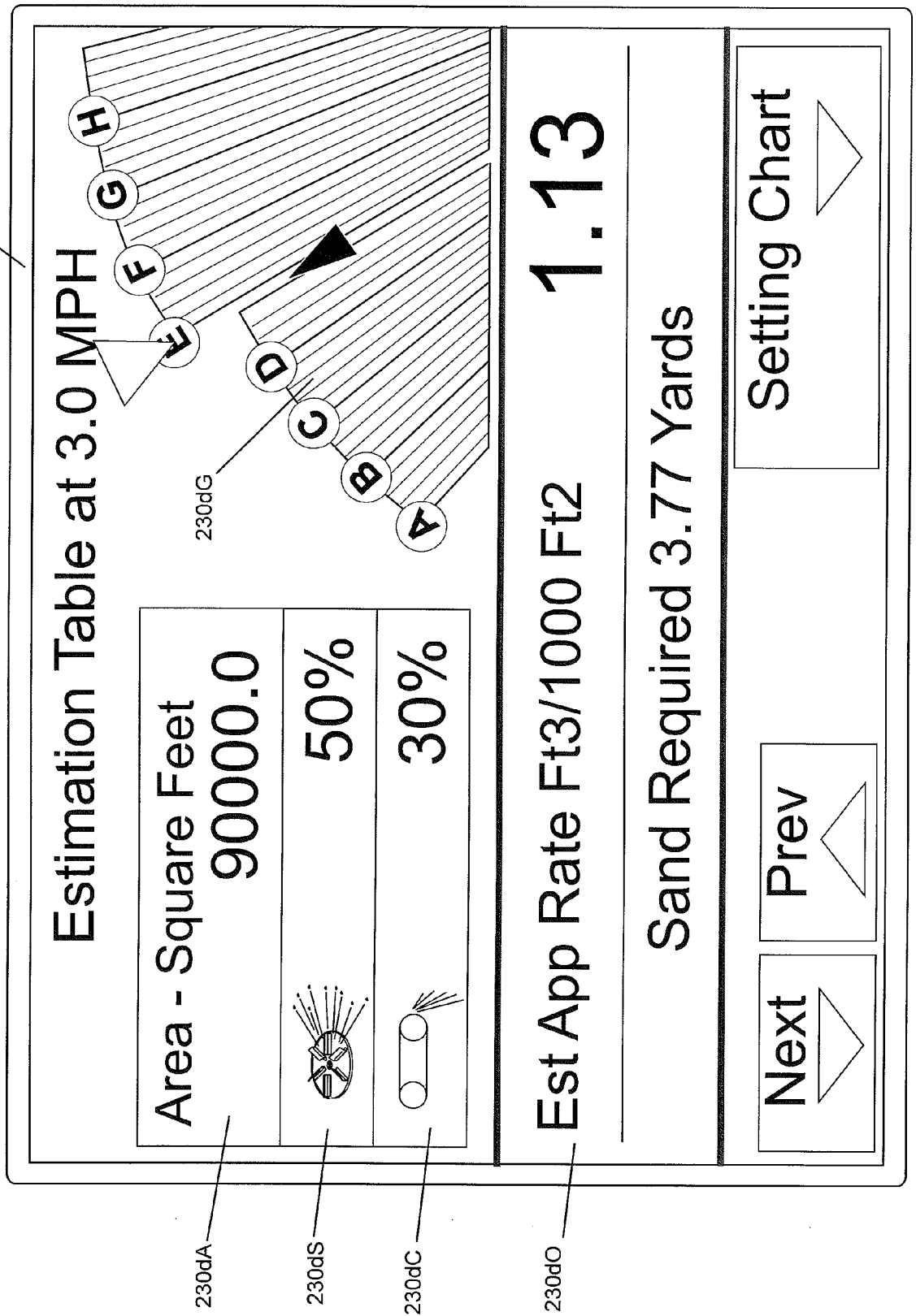

FIG. 9D shows the illustrative application calculation screen 230*d* which appears when function switch 242 is pressed when start-up screen 230*a* is displayed and when function switch 242 is pressed when lookup screen 230*c* is displayed. Screen 230*d* in the form shown includes four inputs: spinner speed input 230*d*S; conveyor speed input 230*d*C; gate opening input 230*d*G; and area input 230*d*A. Screen 230*d* in the form shown includes two outputs 230*d*O:

application rate output and sand volume required output. Specifically, by pressing function switches 240 and 241 for movement down or up, respectively, one of inputs 230dS, 230dC, 230dG and 230dA can be highlighted. After being highlighted, scroll key 234 can be manipulated to increase or decrease the variable of the highlighted input to increase or decrease the speed of spinners 54 or conveyor 140, to increase or decrease the amount of the area intended to be top dressed and to increase or decrease the height of the opening of metering gate 72. The application rate and amount of sand required will be outputted in output 230dO according to the condition of inputs 230dS, 230dC, 230dG and 230dA. In the form shown, application calculation screen 230d simply provides calculations, and does not change the speeds of spinner 54 and conveyor 140 (which is performed in run screen 230b) or the position of metering gate 72. However, controller 210 could be programmed to make change in operation variables based upon application calculation screen 230d.

Figure 9E:
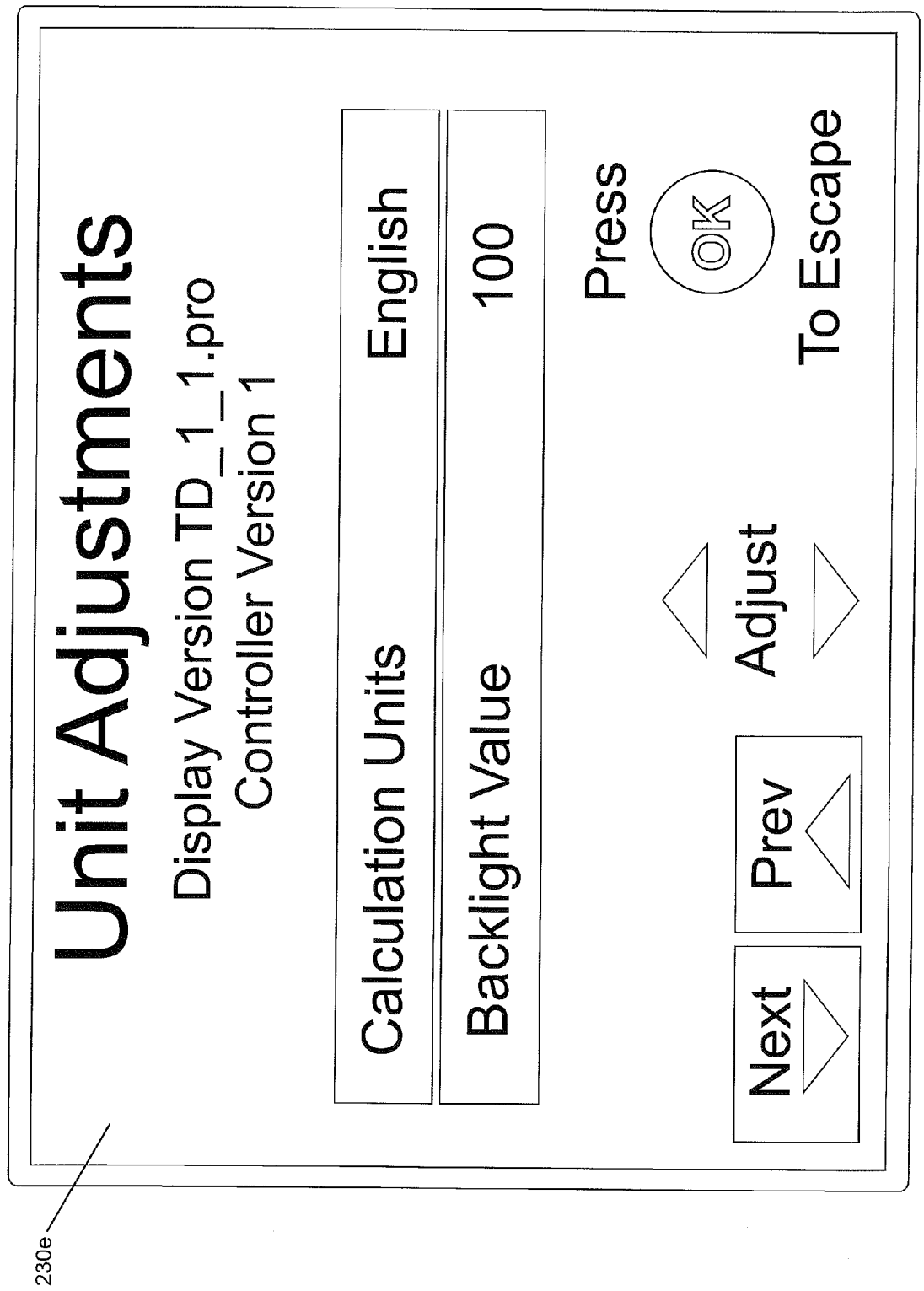

FIG. 9E shows an illustrative units screen 230e which appears when function switch 243 is pressed when start-up screen 230 is displayed. By manipulating function switches 240 and 241 and/or scroll key 234, metric versus English, weight versus volume per area, actual ground speed and flow rates can be entered for use in controller 210, and lists of serving times and operation warnings can be displayed.

Thus, the hydraulic system is controlled with electric signals provided by controller 200 and the direction given by the operator by use of electrical display 210. Specifically, the operator can make adjustments to the settings which will change the application rate preprogrammed into controller 200 and the software of display 210. Programming dictates the amount flow control valves 90 and 92 can travel which will limit the minimum and maximum flow rate and, thus, the speeds of spinner 54 and conveyor 140. Programming inside controller 200 takes the difference between the current valves for the minimum and maximum flow rates and divides the difference by 20 to obtain 5% change increments in the speed range for both motors 56 and motor 156. The closed loop system monitors the current level setting and continuously adjusts the amperage which adjusts the flow control valves 90 and 92 at very small amounts. Further, due to the disclosed relationship of controller 200 and flow control valves 90 and 92, the factory pre-set combinations for function switches 240, 241, 242 and 243 in run screen 230b creates a speed change of spinners 54 and conveyor 140 to replicate a linear line while moving through speeds from 100% to 0%. An advantage of a linear relationship is the ability to calculate the application rate with very dependable results while making adjustments in speeds and gap size depending upon conditions and to achieve the same application rates. As an example, if the sand is wet and the gap is wide, sand can break off in clumps, so the linear relation allows the gap to be reduced but the speed of conveyor 140 increased in application calculation screen 230d while still obtaining the same application rate.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Top dresser comprising, in combination: a hopper for containing top dressing material; a spinner assembly including at least one rotatable spinner rotatable by a hydraulic motor; a dispensing conveyor advancing top dressing material in the hopper onto the at least one rotatable spinner, with the dispensing conveyor driven by a hydraulic motor; a first electrically actuated valve providing hydraulic fluid flow to the hydraulic motor of the spinner assembly; a second electrically actuated valve providing hydraulic fluid flow to the hydraulic motor of the dispensing conveyor; a controller electrically connected to the first and second electrically actuated valves; and an electrical display electronically connected to the controller, with the electrical display including a monitor and at least one switch, with the controller configured to provide electrical signals of an amperage and at a current level setting to the first and second electrically actuated valves under direction of the at least one switch of the electrical display, and with the controller configured to monitor the current level setting and continuously adjust the amperage to the first and second actuated valves and to control the first and second electrically actuated valves according to programming of the controller.

2. The top dresser of claim 1, wherein the hydraulic fluid flow to the hydraulic motor for the dispensing conveyor originates solely from the hydraulic motor of the spinner assembly.

3. The top dresser of claim 1, wherein the at least one switch includes multiple function switches, wherein the controller varies indicated speeds of the at least one rotatable spinner and the dispensing conveyor to replicate a linear line when the multiple function switches are actuated in sequence.

4. The top dresser of claim 3, wherein the monitor displays a run screen displaying the speeds of the at least one rotatable spinner and the dispensing conveyor, and wherein the at least one switch includes a rocker switch, with the rocker switch changing the speeds displayed by moving upward or downward and by moving left-ward or right-ward.

5. The top dresser of claim 4, wherein the at least one switch includes a three position switch moveable from an off position to a first actuation position to a second actuation position, with the first and second electrically actuated valves being closed in the off position, with the first electrically actuated valve being opened and the second electrically actuated valve being closed in the first actuation position, and with the first and second electrically actuated valves being open in the second actuation position.

6. The top dresser of claim 5, wherein the monitor displays a start-up screen and an operating screen, and wherein the monitor displays one of the run screen and the operating screen when one of the multiple function switches is actuated when the monitor displays the start-up screen.

7. The top dresser of claim 6, wherein the operating screen includes a lookup screen displaying the indicated speeds of the at least one rotatable spinner and the dispensing conveyor corresponding to the multiple function switches.

8. The top dresser of claim 7, wherein the hopper includes a metering gate moveable relative to the dispensing conveyor, wherein the operating screen includes an application calculation screen including inputs corresponding to the speeds of the at least one rotatable spinner and the dispensing conveyors and corresponding to a gap between the metering gate and the dispensing conveyor and including an output, with the output being the application rate calculated from the inputs of the speeds of the at least one rotatable spinner and the dispensing conveyors and the gap between the metering gate and the dispensing conveyor.

9. The top dresser of claim 8, wherein the application calculation screen includes an input corresponding to an area intended to be top dressed, and wherein the output is an amount of top dressing material to be contained in the hopper.

10. Sand top dressing method comprising:
advancing sand contained in a hopper on a dispensing conveyor onto at least one rotatable spinner;
rotating the at least one rotatable spinner to broadcast spread the sand from the dispensing conveyor unto a surface;
inputting a rotational speed of the at least one rotatable spinner into an electrical display, with the electrical display including a monitor;
inputting a linear speed of the dispensing conveyor into the electrical display;
electronically transmitting the inputted rotational speed to a controller, with the controller electrically connected to a first electrically actuated valve providing hydraulic fluid flow to a hydraulic motor rotating the at least one rotatable spinner; and
electronically transmitting the inputted linear speed to the controller, with the controller electrically connected to a second electrically actuated valve providing hydraulic fluid flow to a hydraulic motor moving the dispensing conveyor, with the controller providing electrical signals of an amperage and at a current level setting to the first and second electrically actuated valves under direction of the inputted rotational speed and the inputted linear speed, and with the controller monitoring the current level setting and continuously adjusting the amperage to the first and second actuated valves and controlling the first and second electrically actuated valves according to programming of the controller.

11. The method of claim 10, further comprising:
flowing hydraulic fluid to the hydraulic motor moving the dispensing conveyor solely from the hydraulic motor rotating the at least one rotatable spinner.

12. The method of claim 10, further comprising:
actuating multiple function switches on the electrical display varying the rotational speed and the linear speed indicated on the monitor of the electric display; and
replicating a linear line relationship between the rotational speed and the linear speed when the multiple function switches are actuated in sequence.

13. The method of claim 12, further comprising:
displaying a run screen on the monitor of the electrical display, comprising displaying the rotational and linear speeds; and
actuating a rocker switch to change the rotational and linear speeds displayed, with actuating the rocker switch comprising moving the rocker switch upward or downward and by moving the rocker switch left-ward or right-ward.

14. The method of claim 13, further comprising:
moving a three position switch from an off position with the first and second hydraulic valves closed to a first actuation position with the first hydraulic valve open and the second hydraulic valve closed and from the first actuation position to a second actuation position with the first and second hydraulic valves open.

15. The method of claim 14, further comprising:
displaying a start-up screen;
displaying an operating screen; and
actuating one of the multiple function switches while the start-up screen is displayed to display the run screen or the operation screen.

16. The method of claim 15, further comprising:
displaying a lookup screen, with actuating one of the multiple function switches comprising actuating one of the multiple function switches while the start-up screen is displayed to display one of the run screen, the operation screen and the lookup screen.

17. The method of claim 16, wherein displaying the operating screen comprises displaying an application calculation screen including inputs corresponding to the speeds of the at least one rotatable spinner and the dispensing conveyors and a gap between a metering gate and the dispensing conveyor; and wherein the method further comprises:
actuating one of the inputs and calculating an application rate based thereon; and
displaying an output of the application rate in the application calculation screen.

18. The method of claim 17, wherein the application calculation screen further includes an area input corresponding to an area intended to be top dressed, and wherein the method further comprises actuating the area input and calculating an application amount of sand to be included in the hopper.

19. The method of claim 10, further comprising:
actuating multiple function switches on the electrical display varying the rotational speed and the linear speed indicated on the monitor of the electric display; and
replicating a linear line relationship between the rotational speed and the linear speed when the multiple function switches are actuated in sequence.

20. The method of claim 19, further comprising:
displaying a start-up screen;
displaying an operating screen; and
actuating one of the multiple function switches while the start-up screen is displayed to display the run screen or the operation screen.

* * * * *